(12) United States Patent
Hsieh et al.

(10) Patent No.: US 9,109,071 B2
(45) Date of Patent: Aug. 18, 2015

(54) PROCESS FOR PRODUCING CONJUGATED DIENE RUBBER AND COMPOSITE OF THE SAME RUBBER

(76) Inventors: Chi-Chen Hsieh, Kaohsiung (TW); Fu Lin, Kaohsiung (TW); Chi-Ta Tsai, Kaohsiung (TW)

( * ) Notice: Subject to any disclaimer, the term of this patent is extended or adjusted under 35 U.S.C. 154(b) by 0 days.

(21) Appl. No.: 13/326,109

(22) Filed: Dec. 14, 2011

(65) Prior Publication Data
US 2013/0053472 A1 Feb. 28, 2013

(30) Foreign Application Priority Data

| Aug. 31, 2011 | (TW) | ............................ 100131368 A |
| Nov. 18, 2011 | (TW) | ............................ 100142273 A |
| Dec. 13, 2011 | (TW) | ............................ 100145924 A |

(51) Int. Cl.
| C08J 5/14 | (2006.01) |
| C08F 36/04 | (2006.01) |
| C08F 36/06 | (2006.01) |
| C08F 136/04 | (2006.01) |
| C08F 136/06 | (2006.01) |
| C08C 19/44 | (2006.01) |

(52) U.S. Cl.
CPC ................. *C08F 36/04* (2013.01); *C08C 19/44* (2013.01); *C08F 36/06* (2013.01); *C08F 136/04* (2013.01); *C08F 136/06* (2013.01)

(58) Field of Classification Search
None
See application file for complete search history.

(56) References Cited

U.S. PATENT DOCUMENTS

| 4,957,976 | A * | 9/1990 | Takao et al. ................... 525/340 |
| 7,288,594 | B2 * | 10/2007 | Ozawa et al. ................. 525/105 |
| 2010/0016496 | A1 * | 1/2010 | Tanaka et al. ................. 524/506 |
| 2010/0130664 | A1 * | 5/2010 | Rachita et al. ................ 524/445 |

FOREIGN PATENT DOCUMENTS

AU 199667952 B2 * 10/1995 ............... C08L 9/00

\* cited by examiner

*Primary Examiner* — Nicole M Buie-Hatcher
*Assistant Examiner* — Chelsea M Lowe
(74) *Attorney, Agent, or Firm* — Snell & Wilmer L.L.P.

(57) ABSTRACT

A process for producing conjugated diene rubber and its composite includes polymerizing a conjugated diene or a conjugated diene and a vinyl aromatic hydrocarbon in a hydrocarbon solution by anionic polymerization to obtain conjugated diene rubber containing alkali metal in the polymer chain end reacting with at least one organic silane compound to become a modified conjugated diene rubber. After or during the modified conjugated diene rubber contacting with large amount of water, solvent and water content are removed from the modified conjugated diene by applicable hot sources, wherein coupling ratio of modified conjugated diene rubber is less than 40%, coupling ratio of modified conjugated diene rubber after contact with water is at least 50% The conjugated diene rubber and composite exhibit storage stability.

10 Claims, 1 Drawing Sheet

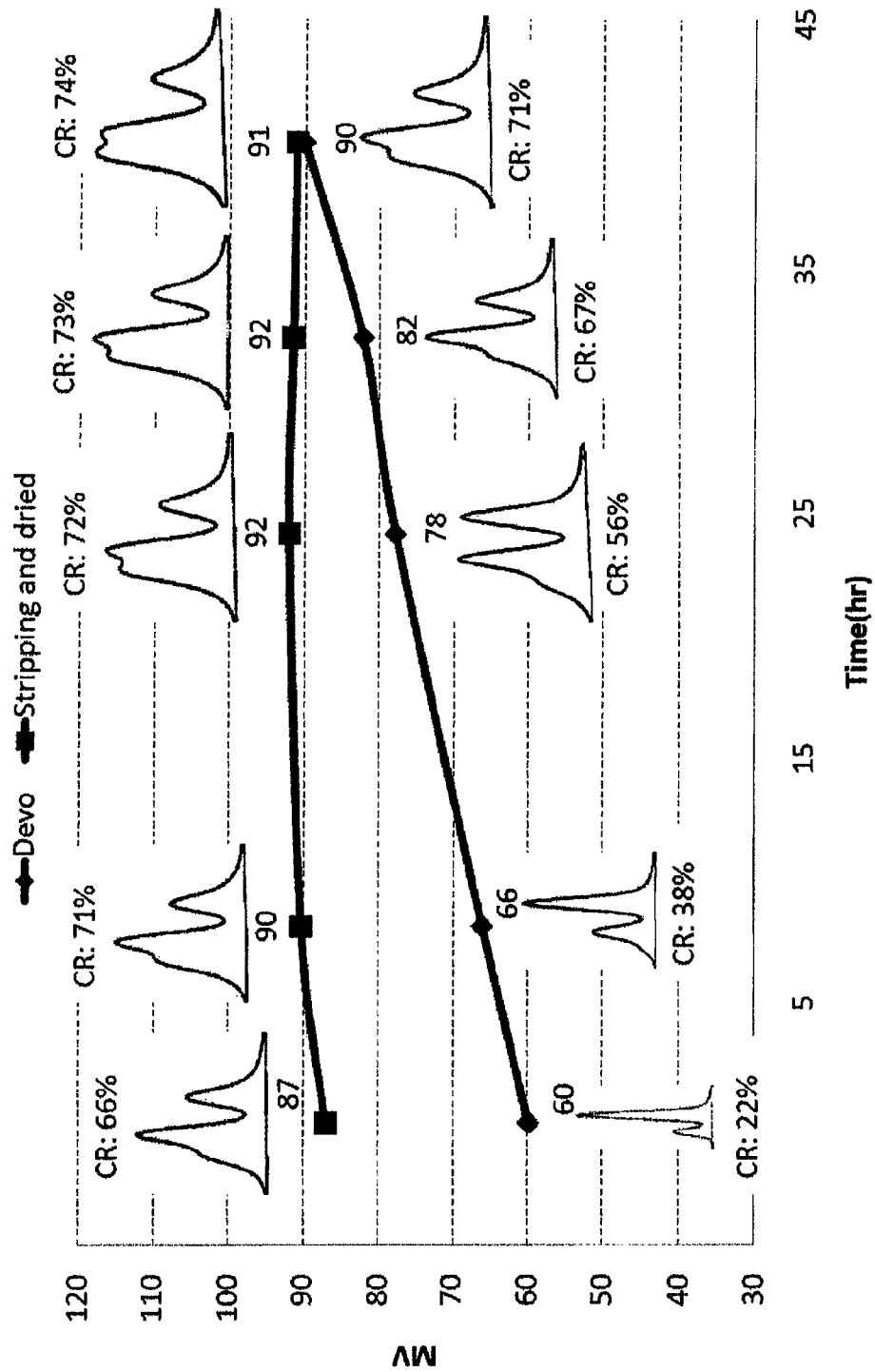

PROCESS FOR PRODUCING CONJUGATED DIENE RUBBER AND COMPOSITE OF THE SAME RUBBER

CROSS REFERENCE TO RELATED APPLICATIONS

This application claims the right of priority based on Taiwan Patent Application No. 100131368 entitled "PROCESS FOR PRODUCING ALKOXYSILYL GROUP CONTAINING CONJUGATED DIENE RUBBER AND COMPOSITE OF THE SAME," filed on Aug. 31, 2011, which is incorporated herein by reference and assigned to the assignee herein.

This application claims the right of priority based on Taiwan Patent Application No. 100142273 entitled "PROCESS FOR PRODUCING CONJUGATED DIENE RUBBER CONTAINING ALKOXYSILYL GROUP AND COMPOSITE OF THE SAME RUBBER," filed on Nov. 18, 2011, which is incorporated herein by reference and assigned to the assignee herein.

This application claims the right of priority based on Taiwan Patent Application No. 100145924 entitled "PROCESS FOR PRODUCING CONJUGATED DIENE RUBBER AND COMPOSITE OF THE SAME RUBBER," filed on Dec. 13, 2011, which is incorporated herein by reference and assigned to the assignee herein.

FIELD OF INVENTION

The present invention relates to a process for producing conjugated diene rubber, and more particularly, to a process for producing conjugated diene rubber with excellent storage stability and a composite of the same conjugated diene rubber.

BACKGROUND OF THE INVENTION

Solution styrene butadiene rubbers are synthetic products consisting of butadiene and styrene units made by solution polymerization method. Industrial production of the solution SBR was first proposed by the U.S. company, Phillips, in batch process and Firestone company in continuous process. Since the solution SBR is superior to the emulsion SBR in mechanical properties, rolling resistance, wet or ice skid resistance, the solution SBR is widely used by the automotive industry and in other rubber products. With the increasingly requirements for cars with low fuel economy, demands on tire rubber materials for such characteristic requirements are also increased. Conjugated diene-based rubbers with low rolling resistance, excellent wear resistance, and balanced wet-skid resistance led to increasing demand by the automobile industry.

On the other hand, the industry has proposed to add silica compounds or mixture of silica compounds and carbon black as a reinforcing agent to a rubber composition. Tire treads containing compounds with mixture of silica and carbon black or silica compounds are favorable with low rolling resistance and wet skid resistance.

Of the related technical publications, U.S. Pat. No. 4,185,042 discloses a coupling agent used for SBS block copolymer. Lithium-containing polymer reacts with the coupling agent (i.e., epoxy-$R^2$—Si(OR)$_2R^1$), thereby obtaining the SBS block copolymer with the coupling ratio>90% and without Si—OR group presented in the SBS block copolymer.

U.S. Pat. No. 5,015,692 discloses an amino silane coupled styrene-butadiene rubber. The chain ends containing lithium of the—diene polymer molecules react with the coupling agent (i.e., $R^1R^2R^3$—Si—(CH$_2$)$_n$—N—$R^4R^5$) to modify the styrene-butadiene rubber. However, there is not any disclosure of modification of the SBR with alkoxysilane group containing compounds.

U.S. Pat. No. 5,219,938 discloses a two-stage modification process. By using two kinds of modifiers, the chain ends containing lithium of—diene polymer molecules react with coupling agents $R_nSiCl_{4-n}$ or $R_nSnCl_{4-n}$ to perform first modification of the styrene-butadiene rubber, and then with the coupling agent ($R^5R^6R^7$—Si—(CH$_2$)$_n$—N—$R^8R^9$) to perform second modification of the styrene-butadiene rubber.

U.S. Pat. No. 5,665,812 discloses modification of the SBR with compounds containing epoxy and alkoxysilane groups. The styrene-butadiene rubber is modified with epoxidized alkoxysilane compounds (e.g., Y—$R^1$—Si(OR$_2$)$_3$).

U.S. Pat. No. 7,288,594 discloses a two-step modification of lithium-containing styrene-butadiene rubber by using two different kinds of silane compounds. In addition, U.S. Pat. No. 7,807,747 discloses a two-step modification of lithium-containing styrene-butadiene rubber by using the same silane compound.

However, none of the above-mentioned related art discloses modification of conjugated diene rubbers to improve storage stability. In practical applications, improvement of storage stability of the conjugated diene rubber, maintaining high reactivity with the silica compounds and sustaining better physical properties are demanded. The conjugated diene rubber and the compositions/composite using the conjugated diene rubber of the present invention are used for tires, soles, flooring materials, vibration isolating materials, etc., and are particularly suitably used for tires, thereby enhancing the tire treads with low rolling resistance and high wet /ice skid resistance resulted in better steering stability and reliability.

SUMMARY OF THE INVENTION

An object of the present invention is to provide manufacturing methods of modified conjugated diene rubber, thereby improving storage stability of the conjugated diene rubber, maintaining high reactivity with the silica compounds and sustaining better physical properties.

According to one aspect of the present invention, manufacturing methods for conjugated diene rubber and compositions/composites of the same rubber are provided. The manufacturing method includes polymerizing a conjugated diene or a conjugated diene and a vinyl aromatic hydrocarbon in a hydrocarbon solution by anionic polymerization using an organic alkali metal compound to obtain conjugated diene rubber containing alkali metal in the polymer chain end, reacting such conjugated diene rubber with at least one organic silane compound to obtain a modified conjugated diene rubber. After or during the modified conjugated diene rubber contacting with large amount of water, then solvent and water content are removed from the modified conjugated diene rubber by applicable hot sources, wherein coupling ratio of modified conjugated diene rubber is less than 40%, coupling ratio of modified conjugated diene rubber after contact with water is at least 50%, more preferably at least 60%, and most preferably at least 70%, and difference of Mooney viscosity (MV) between initial MVi (after water treatment) and MVs (after storage test in 90° C., 80% relative humidity and 40 hours) is less than or equal to 10.

The aforementioned organic silane compound can be represented in the following chemical formula:

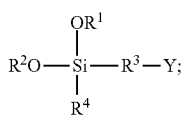

wherein,
$R^1$, $R^2$ are $C_1$~$C_{12}$ alkyl group, $C_6$~$C_{18}$ aromatic group, or allyl group;
$R^3$ is $C_1$~$C_{12}$ alkylene group or $C_6$~$C_{18}$ aromatic group;
$R^4$ is $C_1$~$C_{12}$ alkoxy group, $C_1$~$C_{12}$ alkyl group, $C_6$~$C_{18}$ aromatic group, or allyl group; and
Y is oxygen- and/or nitrogen-containing functional groups.

Preferably, Y includes epoxy, amino, primary or secondary amine, ester, aldehyde, ketone, acrylic acid, acrylate, imidazoline, or any combination thereof. In another embodiment, the aforementioned modification of the conjugated diene rubber can be depicted by the combination of the following formula:

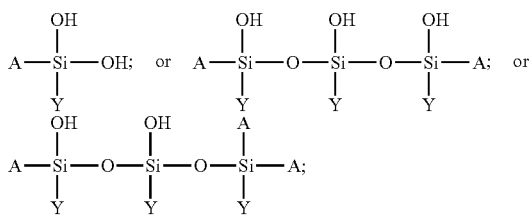

where
Y is oxygen- and/or nitrogen-containing functional groups; and A is a conjugated diene polymer or a copolymer of conjugated diene and vinyl aromatic hydrocarbon.

Preferably, Y includes epoxy, amino, primary or secondary amine, ester, aldehyde, ketone, acrylic acid, acrylate, imidazoline, or any combination thereof.

Another aspect of the invention discloses modified conjugated diene rubber in contact with water, wherein the weight ratio of water to solvent is at least 0.1, preferably is at least 0.5, and more preferably is at least 1. The pH value is 4 to 12, preferably is 5 to 11, and more preferably is 6 to 10. Contact temperatures of the two can be about 20° C. to about 150° C., preferably about 30° C. to about 140° C., and more preferably about 40° C. to 130° C. Contact time of the two can be about 5 minutes to 10 hours, preferably about 10 minutes to 8 hours, and more preferably about 30 minutes to 6 hours. Steam, electric, hot air or other heat source treatment can be implemented to remove the solvent simultaneously or after the modified conjugated diene rubber in contact with water. Other well known drying treatments such as mechanical dewatering, oven drying, or apron drying can subsequently be performed.

It should be noted that during or after the modified conjugated diene rubber contacting with a large amount of water, applicable heat sources can be used for removal of the solvent and water. The heat source treatments used for the aforementioned modified conjugated diene rubber in contact with water include, but not limited to steam stripping, hot gas stripping, or mechanical drying and other similar treatments.

According to another aspect of the invention, a composition/composite of conjugated diene rubber includes a modified conjugated diene rubber and a silica compound combined with the modified conjugated diene rubber, wherein coupling ratio of the modified conjugated diene rubber is less than 40%, coupling ratio of the modified conjugated diene rubber after contact with water is at least 50%, and difference of Mooney viscosity (MV) between initial MVi (after steam stripping treatment) and MVs (after storage test in 90° C., 80% relative humidity and 40 hours) is less than or equal to 10.

The polymers of the present invention include polymers of conjugated diene monomers or copolymers of conjugated diene monomers (e.g., butadiene or isoprene) and vinyl aromatic hydrocarbon monomers (e.g., styrene or methyl styrene). The polymerization methods of each embodiment of the invention include anionic polymerizations using organic alkali metals. Polymer properties of each embodiment of the invention include the initial molecular weight of about 150 to 450 kg/mole; the molar ratio of organic silane compounds to -chain ends of conjugated diene rubber containing active alkali metal is ≥1.1, preferably ≥1.2, and more preferably ≥1.4; and the Mooney viscosity after modification in a range of about 20 to 150, preferably 30 to 140, and more preferably 35 to 130.

The monomers used in the invention are not limited to styrene, butadiene and isoprene, but other suitable derivatives are also applicable in the present invention. For example, the vinyl aromatic hydrocarbon monomer is independently selected from the group consisting essentially of: styrene, methylstyrene and all isomer thereof, ethylstyrene and all isomer thereof, cyclohexylstyrene, vinyl biphenyl, 1-vinyl-5-hexyl naphthalene, vinyl naphthalene, vinyl anthracene, and any combinations thereof. The conjugated diene monomer is independently selected from the group consisting essentially of: 1,3-butadiene, 2,3-dimethyl-1,3-butadiene, 3-butyl-1,3-octadiene, isoprene, 1-methylbutadiene, 2-phenyl-1,3-butadiene, and any combinations thereof.

During polymerization, the preferable option is to use organic alkali metal compounds containing organic lithium as a catalytic initiator, thereby obtaining activated polymers. Carbon-lithium ion forms in the polymer chain ends after addition of monomers, the polymerization then continues by growing the molecular chains. The specific examples of organolithium initiators include n-propyl lithium, isopropyl lithium, n-butyl lithium, sec-butyl lithium, tert-butyl lithium, amyl lithium, phenyl lithium, tolyl lithium, and the likes, preferably n-butyl lithium or sec-butyl lithium. The amount of organolithium initiators used during polymerization depends on the molecular weight of the polymer to be desirably obtained, usually base on the actual consumption amount of total monomers. The weight percent of the organolithium initiators is in a range from 0.005% to 5% based on total monomer Polymerization is performed in the presence of the solvent medium. Solvents suitable for polymerization include such as inert organic solvents, which the inert solvents do not involve in the polymerization reaction. Examples of such inert solvents include aliphatic hydrocarbon compounds such as butane, isobutane, pentane, n-pentane, iso-pentane, 2,2,4-trimethyl pentane, iso-hexane, n-hexane, iso-heptane, n-heptane, iso-octane, and n-octane; or naphthenic family such as cyclohexane, methyl cyclohexane, ethyl cyclohexane, cyclopentane, cycloheptane, methyl cyclopentane; or aromatic compounds such as toluene, xylene, ethylbenzene, diethylbenzene and benzene. The more suitable of those for the present invention includes cyclohexane, mixtures of cyclohexane and n-hexane, butane, or methylcyclopentane.

The polymer concentration of the conjugated diene rubber is generally in a range of about 5% to about 35%, preferably in a range of about 10% to about 30%.

In general, if inert organic solvents are simply used as the polymerization medium, polymerization rates of the vinyl aromatic hydrocarbons or conjugated dienes are slow and polymerization reactivity of the two are quite different. Such difference can be overcome by way of adding polar solvents. The specific examples of applicable polar solvents of the invention include ethers compounds such as tetrahydrofuran, diethyl ether, cyclopentyl ether, dipropyl ether, ethylene glycol dimethyl ether, ethylene glycol diethyl ether, diethylene glycol, dimethyl ether, and methyl ether, preferably such as tetrahydrofuran and diethyl ether, also include amine compound such as tetramethylethylenediamine (TMEDA). The presence of polar solvent can generally increase the vinyl content. The suitable vinyl content for the present invention is in range from about 5% to about 85%. The amount of polar solvent, however, can be adjustable according to the properties of different solvents in order to fall in this range of vinyl content.

The initial polymerization temperature can be at about 10° C. to about 80° C. The final polymerization temperature can be at about 30° C. to about 150° C. The temperature control methods can include adiabatic reaction, constant temperature control, or partial cooling control.

The conjugated diene rubber of the present invention may be used in a conjugated diene composition/composite rubber by mixing another rubber component therewith. Examples of said other rubber component include conventional styrene-butadiene copolymer rubber, polybutadiene rubber, butadiene-isoprene copolymer rubber, and butyl rubber. Specific examples further include natural rubber, ethylene-propylene copolymer rubber, and ethylene-octene copolymer rubber. These components may be used in a mixture of two or more types.

In the case where another rubber component is mixed with the conjugated diene rubber of the present invention, from the viewpoint of good fuel economy, the amount of conjugated diene rubber of the present invention combined, when the total amount of rubber components combined is 100 parts by weight, is preferably at least 10 parts by weight, and preferably at least 20 parts by weight.

Furthermore, the conjugated diene rubber of the present invention may be used in a conjugated diene polymer composition/composite by mixing it with an additive, etc. As the additive, a known additive may be used, and examples thereof include a vulcanizing agent such as sulfur; a vulcanization accelerator such as a thiazole-based vulcanization accelerator, a thiuram-based vulcanization accelerator, or a sulfenamide-based vulcanization accelerator; a vulcanization activator such as stearic acid or zinc oxide; an organic peroxide; a reinforcing agent such as silica or carbon black; a filler such as calcium carbonate or talc; a silane coupling agent; an extender oil; a processing aid; an antioxidant; and a lubricant.

When a conjugated diene rubber composition/composite in which a reinforcing agent is combined with the conjugated diene rubber of the present invention is used, it is preferable to use silica or mixture of silica and carbon black as the reinforcing agent.

When a conjugated diene rubber composition/composite composition is formed by mixing silica with the conjugated diene rubber of the present invention, the amount of silica combined, relative to 100 parts by weight of the rubber component (the total amount of the conjugated diene rubber of the present invention), is normally 10 to 200 parts by weight. From the viewpoint of good fuel economy, the amount combined is preferably at least 20 parts by weight, and more preferably at least 30 parts by weight. From the viewpoint of reinforcement being enhanced, it is preferably no greater than 180 parts by weight, and more preferably no greater than 150 parts by weight.

When a reinforcing agent other than silica is combined with the conjugated diene rubber of the present invention, from the viewpoint of good fuel economy, the amount mixed of the reinforcing agent other than silica, relative to 100 parts by weight of the total amount of the conjugated diene rubber of the present invention, is preferably no greater than 120 parts by weight, and more preferably no greater than 100 parts by weight. From the viewpoint of reinforcement being enhanced, it is preferably at least 1 part by weight, and more preferably at least 3 parts by weight. As the reinforcing agent other than silica, carbon black is a preferable specific example.

As a method for producing a conjugated diene rubber composition/composite composition by mixing another rubber component, an additive, etc. with the conjugated diene rubber of the present invention, a known method such as, for example, a method in which each component is kneaded by means of a known mixer such as a roll or a Banbury mixer or an internal mixer can be used.

With regard to kneading conditions, when an additive, fillers, silica and/or other reinforcing agent, other than a vulcanizing agent or a vulcanization accelerator is mixed, the kneading temperature is normally 50° C. to 200° C., and preferably 80° C. to 150° C., and the kneading time is normally 30 sec to 30 min, and preferably 1 min to 30 min. When a vulcanizing agent or a vulcanization accelerator is combined, the kneading temperature is normally no greater than 100° C., and preferably room temperature to 90° C. A composition in which a vulcanizing agent or a vulcanization accelerator is combined may be used by carrying out a vulcanization treatment such as press vulcanization. The vulcanization temperature is normally 120° C. to 200° C., and preferably 140° C. to 180° C.

The conjugated diene rubber and the conjugated diene rubber composition/composite of the present invention have excellent processability. Furthermore, their fuel economy is good. Moreover, they have good grip performance, wear resistance, tensile strength, etc.

The conjugated diene rubber and the conjugated diene rubber composition/composite of the present invention are used for tires, soles, flooring materials, vibration isolating materials, etc., and are particularly suitably used for tires, thereby enhancing the tire treads with low rolling resistance and high wet skid resistance resulted in better steering stability and reliability.

In accordance with the present invention, there can be provided a conjugated diene rubber composition/composite that can give a rubber composition having excellent processability and good fuel economy even when silica is used as a reinforcing agent, a method for producing the conjugated diene rubber composition/composite, comprising the conjugated diene rubber mixed with silica or mixture of silica and carbon black.

Excellent rolling resistance, wear resistance and tensile strength can be obtained by blending the product according to the aforementioned method of the present invention and the silica compound or mixture of silica compound and carbon black. The amount of silica compound can be 10% to 200% of the conjugated diene rubber of the invention. That is, based on 100 parts of the conjugated diene rubber of the present invention the amount of silica compound is about 10 parts to about 200 parts.

The precipitated silica for the reinforcing filler is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 100 to about 250, square meters per gram (m²/g).

The silica may also have a dibutylphthalate (DBP) absorption value in a range of, for example, about 100 to about 500, and usually about 120 to about 350 cc/g.

Various commercially available synthetic silicas, particularly precipitated silicas, may be considered for use in this invention such as, for example, only and without limitation, silicas commercially available from PPG Industries under the Hi-Sil trademark with designations 210, 243, etc; silicas available from Rhodia, with designations of Zeosil 1165 MP and Zeosil 165GR; silicas available from EVONIK Industries with designations VN2, VN3, 7000GR and 9000GR; and silicas available from Huber, with designations of Zeopol 8745.

The silica reinforcement for the rubber tire tread is used with a coupling agent.

The coupling agents cause the silica to have a reinforcing effect on the rubber, many of which are generally known to those skilled in such art. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of an alkoxy silane which has a constituent component, or moiety, (the alkoxy portion) capable of reacting with the silica surface (e.g., silanol groups on the silica surface) and, also, a constituent component, or moiety, capable of reacting with the rubber, particularly a vulcanized rubber which contains carbon-to-carbon double bonds, or unsaturation. In this manner, then the coupling agent acts as a connecting bridge between the silica and the rubber and thereby enhances the rubber reinforcement aspect of the silica in a manner known to those having skill in such art.

Numerous coupling agents are taught for use in mixing silica and rubber such as, for example, silane coupling agents containing a polysulfide component, or structure, such as bis-(3-alkoxysilylalkl) polysulfide which contains an average from 2 to about 4 (such as for example a range of from 2 to about 3 or a range of from 3 to about 4) connecting sulfur atoms in its polysulfidic bridge such as, for example, a bis-(3-triethoxysilylpropyl) polysulfide.

BRIEF DESCRIPTION OF THE PICTURES

The foregoing aspects and many of the attendant advantages of this invention will become more readily appreciated as the same becomes better understood by reference to the following detailed description, when taken in conjunction with the accompanying pictures, wherein:

FIG. 1 schematically shows the test results of the MV change diagram illustrating the rubbers' storage stability in Comparative Example 1 and Example 1 respectively.

DETAILED DESCRIPTION OF THE INVENTION

The preferred embodiments of the present invention will now be described in greater details by referring to the drawings that accompany the present application.

According to aspects and embodiments of the invention, the modified conjugated diene rubbers containing alkoxysilane group are provided which are suitable for manufacture of the tire tread. However, the conjugated diene rubber containing alkoxysilane group which has Si—OR functional group is unstable in humid surrounding. Mooney viscosity (MV) of the aforementioned conjugated diene rubber will gradually increase during the storage period. As far as the synthetic rubber and tire industries are concerned, such problems are long-felt, long-existing, but unsolved. The reaction mechanism which Mooney viscosity (MV) of the aforementioned conjugated diene rubber polymer gradually increases during the storage period is presented as follows:

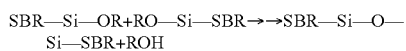

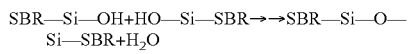

After performing the hydrolysis-condensation reaction, pluralities of modified conjugated diene rubber gradually transform conjugated diene rubbers with multiple branch chains, resulting in an increase in polymer molecular weight. Although conjugated diene rubbers with multiple branch chains are more stable in the environment with moisture, its reactivity with silica compounds is relatively low.

According to some embodiments of the invention, alternative modified conjugated diene rubber can be depicted by the combination of the following formula:

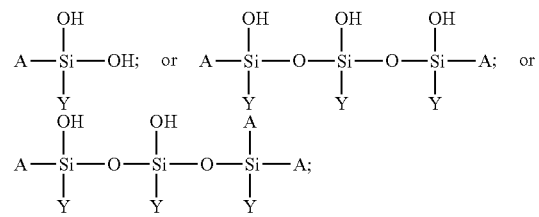

where

Y is oxygen- and/or nitrogen-containing functional groups. Preferably, Y includes epoxy, amino, primary or secondary amine, ester, aldehyde, ketone, acrylic acid, acrylate, imidazoline, or any combination thereof. For example, Y is —CH₂CH₂CH₂—N(CH₂CH₃)₂. A is a polymer of conjugated diene or a copolymer of conjugated diene and vinyl aromatic hydrocarbon. A can be formed from the reaction between free silane modifier and other conjugated diene rubbers.

COMPARATIVE EXAMPLE 1 AND EXAMPLE 1

An autoclave-is provided, with an initial capacity of about 5 liters purged with nitrogen gas. The autoclave is then charged with 2750 grams of cyclohexane, 82.5 grams of tetrahydrofuran (THF), 61 grams of styrene, and 244 grams of 1,3-butadiene. Subsequently, 5.03 mmoles of n-butyl lithium as catalytically active ingredient for polymerization is added to initiate polymerization at 30° C.

At the final stage of the polymeric reaction, 1.47 mmols of (N,N-dimethyl-3-aminopropyl) trimethoxysilane are added. By analyzing with gel permeation chromatography (GPC), the molar ratio of silane to conjugated diene rubber with active chain ends is about 1.4. Then, 2,6-di-tert-butyl-p-cresol is added in the polymer solution. Next, 1500 grams of polymer solution are placed in a dry oven to directly remove solvent. The modified conjugated diene rubber after drying is defined as Comparative Example 1 rubber.

Subsequently, desolvation is performed on the residual polymer solution. After the modified conjugated diene rubber contacting with large amount of water, solvent and water content are removed from the modified conjugated diene rubber by applicable hot sources. For example, steam stripping is performed at 90° C., with a weight ratio of water to solvent at least 1, with pH in a range between 6 and 10, and prolonged 3 hours. The rubber is further dried with a hot roll at 110° C. The modified conjugated diene rubber after steam stripping is defined as Example 1 rubber.

It should be noted that modified conjugated diene rubber of the invention is in contact with water, wherein the weight ratio of water to solvent is at least 0.1, preferably is at least 0.5, and more preferably is at least 1. The pH value is 4 to 12, preferably is 5 to 11, and more preferably 6 to 10. Contact temperatures of the two can be about 20° C. to about 150° C., preferably about 30° C. to about 140° C., and more preferably about 40° C. to 130° C. Contact time of the two can be about 5 minutes to 10 hours, preferably about 10 minutes to 8 hours, and more preferably about 30 minutes to 6 hours. Steam, electric, hot air or other heat source treatment can be implemented to remove the solvent simultaneously or after the modified conjugated diene rubber in contact with water. Other well-known drying treatments such as mechanical dewatering, oven drying, or apron drying can subsequently be performed.

After the modified conjugated diene rubber contacting with a large amount of water, applicable heat sources can be used for removal of the solvent and water. The heat source treatments used for the aforementioned modified conjugated diene rubber in contact with water include, but not limited to steam stripping, hot gas stripping, or mechanical drying.

The molar ratio of the conjugated diene rubber with alkali metals at the polymer chain ends can be obtained by dividing the weight of added monomer by the molecular weight Mi of the polystyrene after corrected by GPC without treatment of the organic silane compound. The molecular weights presented in this specification are based on the standard polystyrene molecular weight measured with the GPC meter.

Side-by-side comparison of the analytical properties of rubbers between Comparative Example 1 and Example 1 are shown in Table 1.

TABLE 1

|  | Unit | Example 1 | Comparative Example 1 |
|---|---|---|---|
| Initial Molecular Weight (Mi) | 10 kg/mole | 276 | 276 |
| Coupling Ratio (polymer solution), (C/R) | % | No | 22 |
| MV (directly de-solvent) |  | No | 60 |
| Coupling Ratio (steam stripping and drying) | % | 66 | No |
| MV (steam stripping and drying) |  | 87 | No |
| Styrene Content | % | 21 | 21 |
| Vinyl Content | % | 63 | 63 |
| Glass Transition Temperature (Tg) | ° C. | −21 | −21 |

In Table 1, the Mooney viscosity (ML1 +4, 100° C.) is measured under the conditions of 1 minute preheating and prolonged 4 minutes at 100° C. The coupling ratio (C/R %) which refers to the ratio of polymers with molecular weight higher than those of uncoupled to the molecular weight of total polymers can be measured with gel permeation chromatography (GPC) equipped with refractive index detector. As performing measurement, tetrahydrofuran is acted as a mobile phase. Microstructure properties (styrene content, 1,2-vinyl content) can be measured with the Fourier transform infrared spectroscopy (FTIR).

The test conditions and results for rubber storage stability of Comparative Example 1 and Example 1 are shown in Table 2.

The MV values of Example 1 rubber during the storage stability test process almost remain constant, while the MV values of Comparative Example 1 rubber during the storage stability test process gradually increase from 60 to 90. Furthermore, the storage stability test results with respect to MV changes in Example 1 rubber and Comparative Example 1 are shown in FIG. 1.

TABLE 2

|  |  | Time (hours) | | | | |
|---|---|---|---|---|---|---|
|  |  | 3 | 8 | 24 | 30 | 40 |
| Example 1 | MV | 87 | 90 | 92 | 92 | 91 |
| Comparative Example 1 | MV | 60 | 66 | 78 | 82 | 90 |

EXAMPLES 2-5

The polymerization procedures of Examples 2-5 are basically similar to that of

Example 1, for the sake of simplicity and concise, the same description therefore is omitted. The difference is that the polymerization procedure of Example 2 adds imidazolinepropyltrimethoxysilane, the polymerization procedure of Example 3 adds 3-glycidoxypropyltrimethoxysilane, the polymerization procedure of Example 4 adds N,N-bis(trimethylsilyl)aminopropylethyldiethoxysilane, and the polymerization procedure of Example 5 adds 3-dimethylaminoethyldiethoxy-methylsilane. Comparative analysis among the properties of synthesized conjugated diene rubber of Examples 2-5 are shown in Table 3.

TABLE 3

|  | Unit | Example 2 | Example 3 | Example 4 | Example 5 |
|---|---|---|---|---|---|
| Ratio of alkoxysilane compound to SBR containing lithium |  | 1.9 | 1.4 | 1.5 | 1.2 |
| Initial Molecular Weight (Mi) | 10 kg/mole | 35 | 30 | 31 | 26 |
| Coupling Ratio (polymer solution) | % | 10 | 25 | 27 | 29 |
| MV (directly de-solvent) |  | 68 | 58 | 63 | 54 |
| Coupling Ratio (steam stripping and drying) | % | 63 | 73 | 71 | 76 |
| MV (steam stripping and drying) |  | 101 | 96 | 100 | 87 |
| Styrene Content | % | 21.2 | 21 | 20.1 | 20.5 |
| Vinyl Content | % | 61.9 | 62.1 | 61.7 | 63 |
| MV Increase (after 40 hours, 80% humidity oven treatment) |  | 3 | 2 | 4 | 7 |
| Compound MV |  | 65 | 61 | 63 | 60 |
| $T_B$ | Kgf/cm$^2$ | 129 | 123 | 107 | 100 |
| $E_B$ | % | 500 | 470 | 450 | 430 |
| Akron Abrasion (Index) |  | 136 | 113 | 105 | 107 |

TABLE 3-continued

| | Unit | Example 2 | Example 3 | Example 4 | Example 5 |
|---|---|---|---|---|---|
| tanδ (0° C.) | | 105 | 105 | 105 | 101 |
| tanδ (60° C.) | | 108 | 110 | 101 | 100 |

Akron abrasion (Index): testing angle: 15°; loading: 2.72 kgs.

The advantages of abovementioned examples of the invention are in that alkoxysilyl-containing modifiers and steam stripping step are provided such that the modified conjugated diene rubber has better storage stability, high reactivity with silica compounds is maintained, and better physical properties are also achieved. Various embodiments of the invention provide polymers of conjugated diene monomers, or copolymers of conjugated diene monomers (e.g., butadiene or isoprene) and the vinyl aromatic hydrocarbon monomers (e.g., styrene or methyl styrene). Various embodiments of the invention provide methods of polymerization include organic anionic polymerization with alkali metals. Various embodiments of the invention provide polymers with a ratio of modifier to conjugated diene rubber containing lithium greater than or equal to 1.1. The Mooney viscosity after modification is in a range from about 20 to about 150. The Mooney viscosity after steam stripping is in a range from about 30 to about 150. The coupling ratio after modification is <40%. The coupling ratio after steam stripping is ≥50%. The difference between initial Mooney viscosity MVi and MVs (after storage test in 90° C., 80% relative humidity and 40 hours) is ≤10. The Mooney viscosity is tested with model ALPHA MOONEY MV 2000.

In order to achieve fuel economy, 100 parts by weight of a polymer, 78.4 parts by weight of silica (product name: Ultrasil 7000GR, manufactured by EVONIK Industries), 6.9 parts by weight of a silane coupling agent (product name: Si69, manufactured by EVONIK Industries), 50.0 parts by weight of an extender oil, 1.5 parts by weight of an antioxidant (product name: Antigene 3C), 2 parts by weight of stearic acid, 2 parts by weight of zinc oxide, 1.5 parts by weight of a wax, 1.4 parts by weight of sulfur, and 2 parts by weight of a vulcanization accelerator (1 part by weight each of product names CZ and D) were kneaded to give a composition. The composition thus obtained was molded into a sheet using a two roll machine, the sheet was heated at 160° C. for 45 minutes to thus effect vulcanization, and a vulcanized sheet was obtained.

A loss tangent at 60° C. (tan δ (60° C.)) of the vulcanized sheet was measured using a viscoelastometer under conditions of a strain of 1% and a frequency of 10 Hz. Based on the Comparative Example as standard, let comparative example 1 set as 100%, the higher value of the examples, the better effect of fuel economy. A loss tangent at 0° C. (tanδ (0° C.)) of the vulcanized sheet was measured using a viscoelastometer under conditions of a strain of 0.5% and a frequency of 10 Hz. Based on the Comparative Example as standard, let comparative example 1 set as 100%, the higher value of the examples, the better effect of safety on gripping and braking.

While the invention has been described by way of examples and in terms of preferred embodiments, it would be apparent to those skilled in the art to make various equivalent replacements, amendments and modifications in view of specification of the invention. Therefore, the scope of the appended claims should be accorded the broadest interpretation so as to encompass all such replacements, amendments and modifications without departing from the spirit and scope of the invention.

The invention claimed is:

1. A process for producing conjugated diene rubber, comprising:
   polymerizing a conjugated diene or a conjugated diene and a vinyl aromatic hydrocarbon in a hydrocarbon solvent by anionic polymerization using an organic alkali metal compound to obtain alkali metal-containing conjugated diene rubber;
   reacting the conjugated diene rubber containing the alkali metal in the polymer chain end with at least one organic silane compound, wherein coupling ratio of the modified conjugated diene rubber is less than 40%;
   allowing the modified conjugated diene rubber in contact with water, wherein the weight ratio of water to the hydrocarbon solvent is at least 0.1, and coupling ratio of the modified conjugated diene rubber after contact with water is at least 50%;
   removing the hydrocarbon solvent and water from the modified conjugated diene rubber by applicable hot sources, after or during the modified conjugated diene rubber in contact with water; and
   applying a storage test in 90° C., 80% relative humidity and 40 hours to the modified conjugated diene rubber,
   wherein difference of Mooney viscosity (MV) between initial MVi after the water contact and MVs after the storage test is less than or equal to 10.

2. The process as claimed in claim 1, wherein the step of contacting the modified conjugated diene rubber with water comprises contacting the modified conjugated diene rubber with water with a pH of 4 to 12, at contact temperature of 20 to 150° C. and at contact period of 5 minutes to 10 hours.

3. The process as claimed in claim 1, wherein the organic silane compound comprises alkoxysilyl group compounds denoted by the following formula:

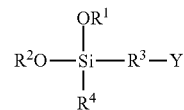

wherein
R¹ and R² are $C_1$-$C_{12}$ alkyl group, $C_6$-$C_{18}$ aromatic group, or allyl group;
R³ is $C_1$-$C_{12}$ alkyl group or $C_6$-$C_{18}$ aromatic group;
R⁴ is $C_1$-$C_{12}$ alkoxy group, $C_1$-$C_{12}$ alkyl group, $C_6$-$C_{18}$ and
Y is oxygen— and/or nitrogen-containing functional groups.

4. The process as claimed in claim 3, wherein the Y of the alkoxysilyl group compounds or the modified conjugated diene rubber comprises epoxy groups, tertiary amino groups, secondary or primary amine groups, ester groups, aldehyde groups, ketone groups, acrylate groups, imidazoline groups, and combinations thereof.

5. The process as claimed in claim 1, wherein the modified conjugated diene rubber after contacted with water can be depicted by the combination of the following formula:

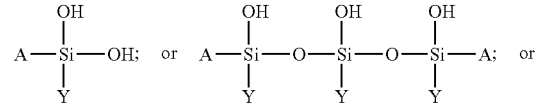

-continued

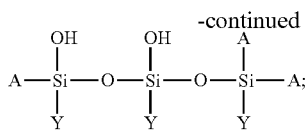

wherein

Y is oxygen— and/or nitrogen-containing functional groups; and

A is conjugated diene polymer or copolymer of conjugated diene and vinyl aromatic hydrocarbon.

6. The process as claimed in claim 5, wherein the Y of the alkoxysilyl group compounds or the modified conjugated diene rubber comprises epoxy groups, tertiary amino groups, secondary or primary amine groups, ester groups, aldehyde groups, ketone groups, acrylate groups, imidazoline groups, and combinations thereof.

7. The process as claimed in claim 1, wherein the conjugated diene is independently selected from the group consisting essentially of: 1,3-butadiene, 2,3-dimethyl-1,3-butadiene, 3-butyl-1,3-octadiene, isoprene, 1-methylbutadiene, 2-phenyl-1,3-butadiene, and combinations thereof.

8. The process as claimed in claim 1, wherein the treatment after or during the modified conjugated diene rubber in contact with water comprises steam stripping, hot gas stripping, or mechanical drying.

9. The process as claimed in claim 1, wherein the vinyl aromatic hydrocarbon is independently selected from the group consisting essentially of: styrene, methylstyrene and all isomers thereof, ethylstyrene and all isomers thereof, cyclohexylstyrene, vinyl biphenyl, 1-vinyl-5-hexyl naphthalene, vinyl naphthalene, vinyl anthracene, and combinations thereof.

10. The process as claimed in claim 1, wherein the ratio of the organic silane compound to the conjugated diene rubber containing alkali metal in the polymer chain end is greater than or equal to 1.1.

* * * * *